United States Patent [19]

Sako et al.

[11] Patent Number: 4,807,479

[45] Date of Patent: Feb. 28, 1989

[54] TRANSDUCER FOR DETECTING PRESSURE CHANGES IN PIPES

[75] Inventors: Junichi Sako, Takatsuki; Muneaki Kanenobu, Suita, both of Japan

[73] Assignee: Daikin Industries, Ltd., Osaka, Japan

[21] Appl. No.: 163,846

[22] Filed: Mar. 3, 1988

[30] Foreign Application Priority Data

Mar. 6, 1987 [JP] Japan .................................. 62-52822

[51] Int. Cl.$^4$ ........................... G01L 7/04; G01L 9/08
[52] U.S. Cl. ................................. 73/730; 73/119 A; 73/DIG. 4; 73/754
[58] Field of Search ................. 73/730, 119 A, 167, 73/35, DIG. 4, 754

[56] References Cited

U.S. PATENT DOCUMENTS

| | | | |
|---|---|---|---|
| 4,065,969 | 1/1978 | Dinwiddle | 73/730 |
| 4,304,126 | 12/1981 | Yelke | 73/754 |
| 4,391,147 | 7/1983 | Krempl et al. | 73/730 |

Primary Examiner—Donald O. Woodiel
Attorney, Agent, or Firm—Wenderoth, Lind & Ponack

[57] ABSTRACT

A transducer for detecting pressure changes in pipes by detecting deformation of the pipes and for converting the pressure changes in the pipes into electric signals uses a bimorph as a sensor element. This bimorph is pressed to the pipe surface by means of a holder. The transducer is free from complicated adjustment of the pressing force against the sensor element, very simple in structure, easy to adjust when mounting, light in weight so as to hardly influence an injection system, and less susceptible to effects of noise due to vibration.

11 Claims, 6 Drawing Sheets

TRANSDUCER FOR DETECTING PRESSURE CHANGES IN PIPES

BACKGROUND OF THE INVENTION

1. Field of the Invention

This invention relates to a transducer for detecting pressure changes in pipes to detect changes of internal pressure in, for example, injection pipes of diesel engines or piping of oil pressure equipment, by detecting deformation of steel pipes (hereinafter abbreviated as "transducer").

2. Description of the Prior Art

As a transducer for detecting pressure changes in pipes, there is known a transducer which is a pressure sensor using strain gauges or piezoelectric elements directly mounted on the inner wall of a fuel injection pipe of a diesel engine. To install this transducer in the pipe, a part of the fuel injection pipe must be designed to be opened, and the transducer must be put in or taken out of the pipe through this opening. Therefore, when installing the transducer in the pipe, if the fitting of the opening is imperfect, dust gets into the pipe, possibly clogging the injection pipe. This can result in trouble in the fuel injection system or malfunction of the engine itself.

For avoiding such problem, it is known to a transducer outside the pipe. For example, Japanese Patent Publication No. 58-40133 discloses a transducer in a structure in which a curved piezoelectric element is mounted in tight contact around a pipe, and an elastic holder is disposed between this piezoelectric element and a rigid transducer case which wraps around the outside of the piezoelectric element. Since the piezoelectric element of this transducer is tightly held against the pipe by its holder, if the pipe is deformed, a strong frictional force is created between the pipe and the piezoelectric element, so that the deformation of the pipe is accurately transmitted to the piezoelectric element.

In this transducer, a thin piezoelectric element, for example, is used as a sensor element. Since the sensor element detects changes in the peripheral length of the pipe, not changes in the diameter of the pipe, it is necessary to transmit the pipe deformation accurately to the sensor element. Therefore, in order to transmit the pipe deformation accurately to the sensor element, the pressing force between the pipe and the sensor element must be adjusted.

In this transducer, meanwhile, inertial force acts on the sensor element due to the vibration of pipe caused when the pressure in the pipe rises suddenly, and noise is formed in the output signal of the transducer due to forces other than fluctuation of the pipe internal pressure. To lower this noise, it is required to make the case of the transducer of a rigid structure, to mount the case of the transducer firmly on the pipe, and for the sensor element to be completely free from supporting the sensor element itself. For this purpose, in this transducer, the mounting structure of the sensor element is complicated, and adjustment when mounting becomes difficult.

SUMMARY OF THE INVENTION

It is hence a primary object of this invention to provide a transducer which is, in view of the above disadvantages, free from complicated adjustment of the pressing force against the sensor element, very simple in structure, easy to adjust when mounting, light in weight so as to hardly influence the injection system, and less susceptible to effects of noise due to vibration.

To achieve the above and other objects, a transducer according to the invention detects pressure changes in a pipe as a function of deformation of the pipe and converts the pressure changes in the pipe into electric signals, which transducer comprises a sensor element having a bimorph structure (hereinafter referred to as "bimorph") made of piezoelectric material, and a holder for forcing the sensor element against an outer surface of the pipe.

In a preferred embodiment, the sensor element is provided with an intermediate layer installed between piezoelectric pieces.

In another preferred embodiment, the holder is supported by a rigid case surrounding the pipe.

In a further preferred embodiment, the holder is an expansive band.

In a still further preferred embodiment, the ends of the expansive band are fixed to the case.

Further, to achieve the above and other objects, a transducer for detecting pressure changes in a pipe according to the invention detects deformation of the pipe and generates electric signals representative of such deformation as an indication of pressure changes, which transducer comprises a sensor element having a bimorph structure made of piezoelectric material, and a pressure medium for forcing the sensor element against an outer surface of the pipe.

In a preferred embodiment, the pressure medium is gas or liquid.

In another preferred embodiment, soft thin-wall parts are disposed between the pressure medium and the sensor element.

In a further preferred embodiment, the soft thin-wall parts are rubber.

In a still further preferred embodiment, the holder surrounds the pipe.

In another preferred embodiment, the ends of the holder are fixed by tightening pieces.

Here, the bimorph used in the sensor element is fabricated by gluing two piezoelectric pieces together. That is, as shown in FIG. 3, in one type of bimorph, two piezoelectric pieces 51, 52 are glued together in mutually opposite polarization directions 53, 54, and external electrodes 55, 56 are coupled with electric terminals 57, 58, thus defining a series type bimorph. In another type of bimorph, as shown in FIG. 4, two piezoelectric pieces 59, 60 are glued together in identical polarization directions 61, 62. An electrode 63 is glued between the piezoelectric piece 59 and the piezoelectric piece 60 and is connected to an electric terminal 67. External electrodes 64, 65 are electrically connected together and with an electric terminal 66, thus defining a parallel type bimorph. In this invention, both types of bimorph can be used.

Piezoelectric pieces to compose the bimorph are usually made of high polymer piezoelectric material or a mixture of ceramic piezoelectric material with high polymer material or high polymer piezoelectric material, and examples of high polymer piezoelectric material may include vinylidene fluoride polymers such as vinylidene fluoride homopolymer and vinylidene fluoride-trifluoroethylene copolymer.

The measuring principle of the transducer which uses the bimorph is as follows. The transducer can detect changes in the pipe diameter caused by pipe internal pressure changes by sensing voltage changes. Supposing the output voltage of the transducer to be Vp [V], it is expressed as follows:

$$V_p = c g t^2 r^{-1} \quad (I)$$

where
- c: modulus of a elasticity of piezoelectric piece [N/m$^2$]
- g: voltage output coefficient of the piezeoelectric piece [V·m/N]
- t: thickness of the piezoelectric piece [m]
- r: radius of curvature (distance from pipe center to middle of bimorph) [m]

As is clear from equation (I), since the output voltage Vp is proportional to the square of the thickness of a single piezoelectric piece, a greater output voltage is obtained when the thickness of piezoelectric piece is increased, so that the sensitivity of detection is enhanced. Besides, by installing an intermediate layer between the piezoelectric pieces, the transformation of the piezoelectric piece (in particular the outside piezoelectric piece) can be amplified, so that the sensitivity of detection may be improved. The material of the intermediate layer is not particularly limited as long as it is a conductor, and more preferably metal sheets such as copper and aluminum are used. The thickness of the intermediate layer may be preferably 0.1 to 2.0 mm.

In this invention it is required that the bimorph be pressed on the pipe surface so as to follow up changes in the pipe diameter at high fidelity, and a holder is used for this purpose. As the material for the holder, an elastic rubber or an expansive band may be preferably used. When an elastic piece is used as the holder, it is desired to dispose it between a case and the bimorph by using the case to enclose the outside of the pipe. Or when a split case is used, the holder may be detachably affixed to the pipe to be measured by a tightening bolt, snap clamp or spring clip. Or when an expansive band is used as the holder, it is disposed so as to wind around the outside of the pipe, and the bimorph is disposed between the pipe and the band, and when a clamp is attached to the end of the band, it may be detachably affixed to the pipe without using a case.

When the bimorph is pressed on the pipe surface by way of the holder, the bimorph may be directly pressed on the pipe surface, or indirectly by way of a protective layer such as metal foil. In any case, it is enough when the bimorph is pressed on the pipe surface to such an extent that changes of the radius of curvature of the pipe can be detected by following up the pipe diamter changes, and it is not necessary to cause a frictional force to transmit all deformation of the pipe surface accurately between the pipe and the bimorph. When the measuring element was a mere piezoelectric piece as in the prior art, it was required that the piezoelectric piece was pressed tightly against the pipe in order to detect changes in the peripheral length of the pipe. By contrast, in the case of this invention using the bimorph, the principle of measurement is different, that it, the changes in the radius of curvature of the pipe are detected instead of the changes in the peripheral length of the pipe, and hence it is not necessary to press the piezoelectric piece tightly against the pipe. Incidentally, in the case of a bimorph, if a force acts in the circumferential direction of the pipe due to changes in the peripheral length of the pipe, changes in voltage are not detected because electric charges occurring in the two piezoelectric pieces cancel each other.

In the transducer of this invention, since a bimorph is used in the sensor element, the effects of noise caused by vibration of the pipe may be prevented without using a transducer case of a special structure to absorb the supporting force for the sensor element, as was necessary with the conventional transducer. That is, when an inertial force is built up in the bimorph itself due to pipe vibration, the bimorph is pressed in the direction of thickness by this inertial force, but in this case, the electric charges occurring the two piezoelectric pieces in the bimorph cancel each other, so that voltage changes are not produced. Therefore, the structure of the transducer may be much simplified.

According to this invention, complicated adjustment of the pressing force of the sensor element to the pipe is not needed, the structure may be simplified, and noise caused by inertial forces acting on the sensor element itself by pipe vibration may be prevented.

BRIEF DESCRIPTION OF THE DRAWINGS

These and other objects of the present invention as well as features and advantages thereof will be better understood by considering the following description taken in conjunction with the drawings in which.

DETAILED DESCRIPTION OF THE PREFERRED EMBODIMENTS

Figure 1:
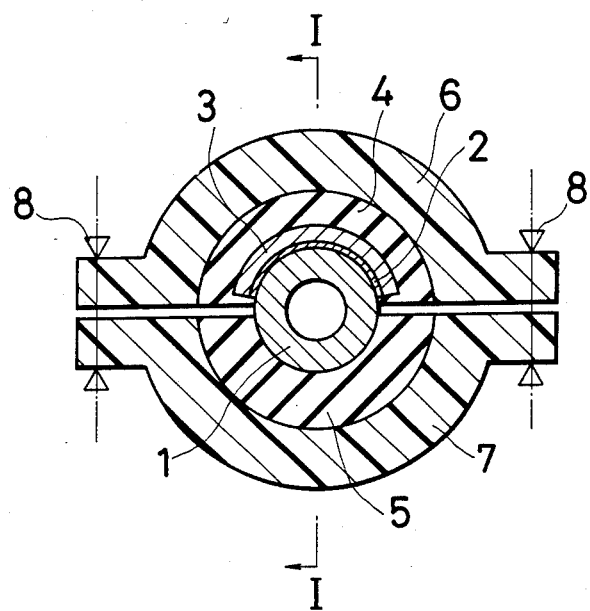
FIG. 1 is a sectional view of one embodiment of the transucer of this invention.

Referring now to the drawings, some of the preferred embodiments of this invention are described in detail below.

Figure 2:
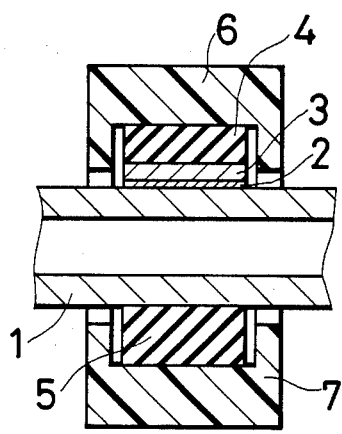
FIG. 2 is a sectional view along line I—I in FIG. 1.
Figure 3:
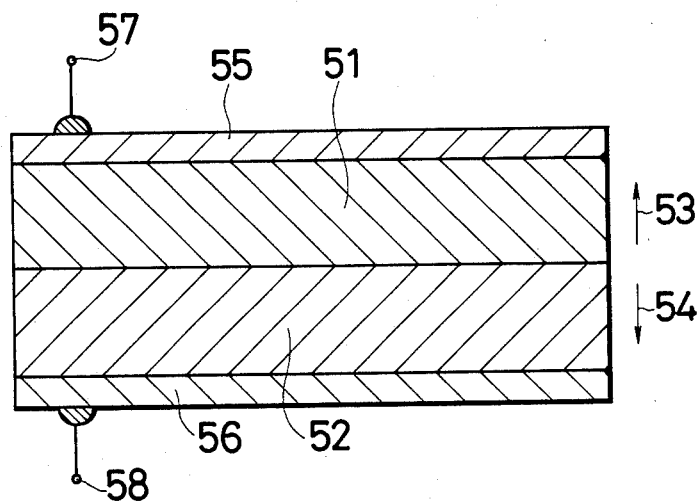
FIG. 3 is a sectional view of one embodiment of a bimorph.
Figure 4:
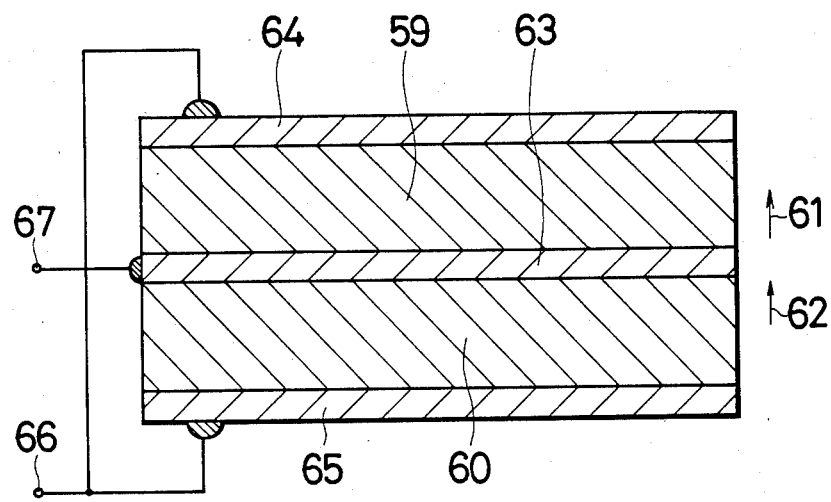
FIG. 4 is a sectional view of another embodiment of a bimorph.

FIG. 1 is a sectional view showing one embodiment of the transducer of this invention, and FIG. 2 is a sectional view along line I—I in FIG. 1. In FIG. 1, a pressure conduit 1 is a conduit for detecting pressure changes in a pipe, and a bimorph 3 which is a sensor element is forced on pressure conduit 1 by a holder 4 by way of a protective layer 2. The protective layer 2 is to protect the bimorph 3, and it is, for example, a metal foil. A holder 5 directly supports the pressure conduit 1. The holders 4, 5 are elastic materials such as rubber. From outside the holders 4, 5, cases 6, 7 in the form of two half structures are mounted by means of tightening devices 8 such as tightening bolts.

The function of the transducer in FIG. 1 and FIG. 2 is described next. When a fuel oil is sent into the pressure conduit 1 under pressure, the diameter of the pressure conduit 1 varies accordingly. A change of diameter of pressure conduit 1 means a change of radius of curvature r of the pipe or conduit, and in the bimorph 3, as is clear from the foregoing equation (I), a voltage Vp corresponding to the change in the radius of curvature r occurs. By detecting this voltage change, the pressure change in the pressure conduit may be known. If, meanwhile, the pressure conduit 1 vibrates, an inertial force is generated in the transducer, and it may be applied to the bimorph. But in the case of the bimorph, if an inertial force is applied, the voltage change is not detected by the action mentioned above. Therefore, the transducer of this invention can prevent detection of noise due to inertial forces.

Figure 5:
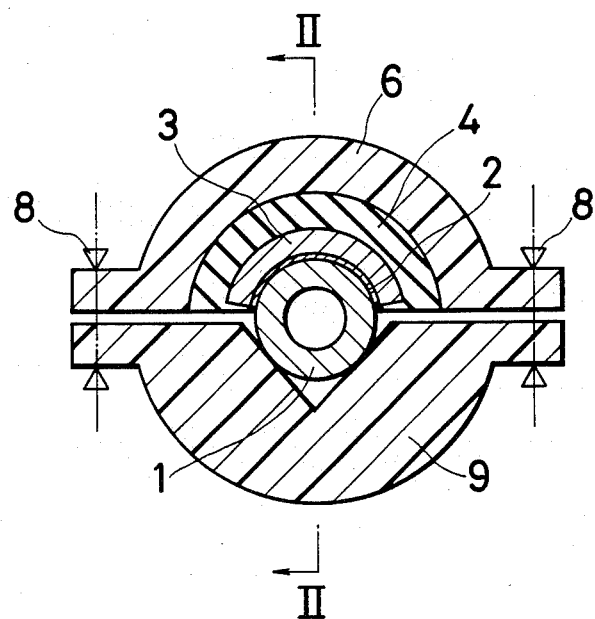
FIG. 5 is a sectional view of another embodiment of the transducer of this invention.
Figure 6:
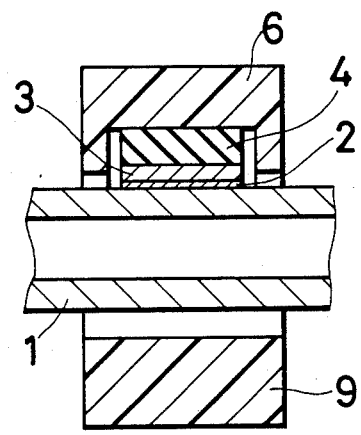
FIG. 6 is a sectional view along line II—II in FIG. 5.

FIG. 5 is a sectional view of another embodiment of the transducer of this invention, and FIG. 6 is a sectional view along line II—II in FIG. 5. As compared with the transducer shown in FIG. 1, there is no holder 5, and the lower part in FIG. 5 of the pressure conduit 1 is supported by a V-shaped groove in a case 9. In the transducer of this invention, since it is not always necessary to dispose the sensor elements symmetrically to the pipe, such simplified structure is realized. The function of the bimorph 3 to detect pressure changes in the conduit 1 is the same as that of the transducer in FIG. 1.

Figure 7:
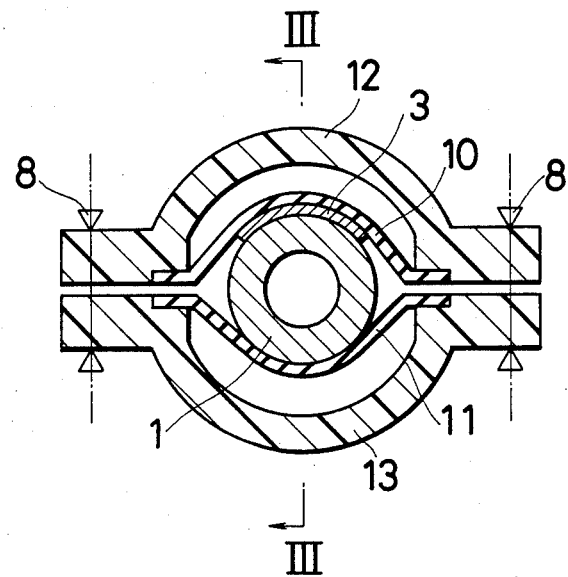
FIG. 7 is a sectional view of a different embodiment of the transducer of this invention.
Figure 8:
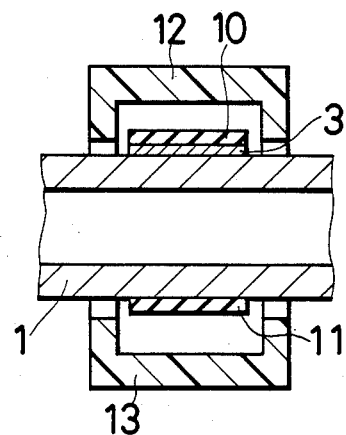
FIG. 8 is a sectional view along line III-III in FIG. 7.

FIG. 7 is a sectional view of a different embodiment of the transducer of this invention, and FIG. 8 is a sectional view thereof along line III—III. In FIG. 7, reference numerals 10, 11 denote holders made of expansive bands, and the band 10 is used to force the bimorph 3 against the outer surface of the pressure conduit 1 by its tension, while the band 11 directly holds the pressure conduit 11. The ends of the bands 10, 11 are respectively fixed to cases 12, 13. Similarly, the function of the bimorph 3 to detect pressure changes in the conduit 1 is the same as that of the transducer in FIG. 1.

Figure 9:
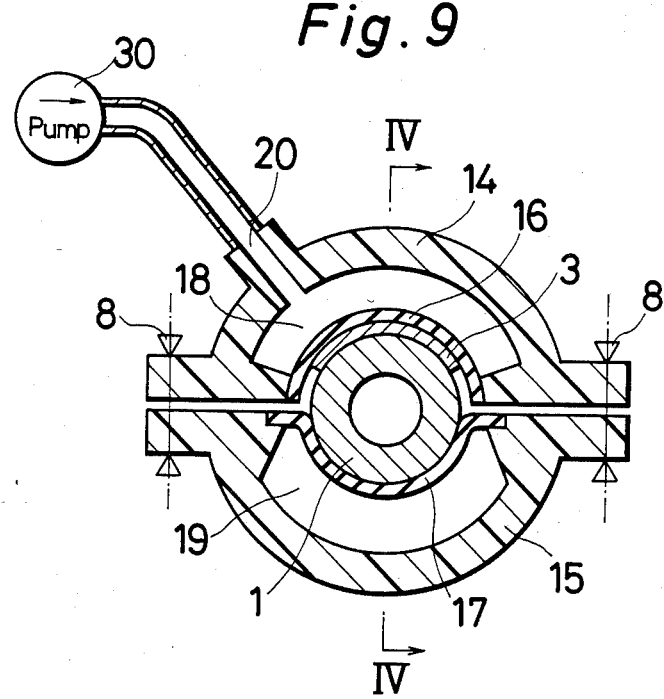
FIG. 9 is a sectional view of a still different embodiment of the transducer of this invention.
Figure 10:
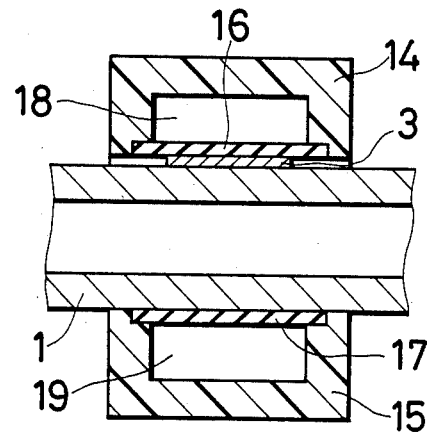
FIG. 10 is a sectional view along line IV—IV in FIG. 9.

FIG. 9 is a sectional view of another embodiment of the transducer of this invention, and FIG. 10 is a sectional view thereof along line IV—IV. In FIG. 9, rubber or other soft material thin-wall parts 16, 17 are disposed in cases 14, 15, and airtight chambers 18, 19 are defined between the cases 14, 15 and the soft thin-wall parts 16, 17. The ends of the soft thin-wall parts 16, 17 are respectively fixed to the cases 14, 15. The bimorph is disposed on the pressure conduit 1 and protected by the soft thin-wall part 16. By filling airtight chambers 18, 19 with air or other gas, or oil or other pressure medium, the bimorph 3 is forced against the outer surface of the pressure conduit 1, and the pressure conduit 1 is supported. Meanwhile, an injection port 20 is disposed in the airtight chamber 18, and the pressure in the airtight chambers 18, 19 can be adjusted by controlling the discharge pressure of a pump 30. Likewise, the function of the bimorph 3 to detect pressure changes in the conduit 1 is the same as that of the transducer in FIG. 1.

Figure 11:
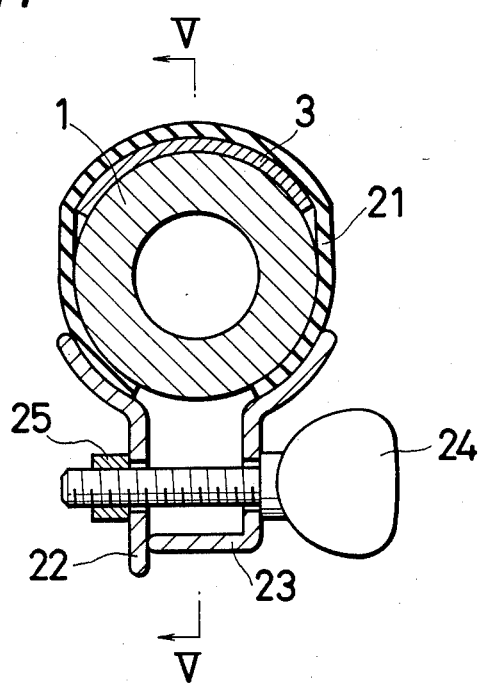
FIG. 11 is a sectional view of another different embodiment of the transducer of this invention.
Figure 12:
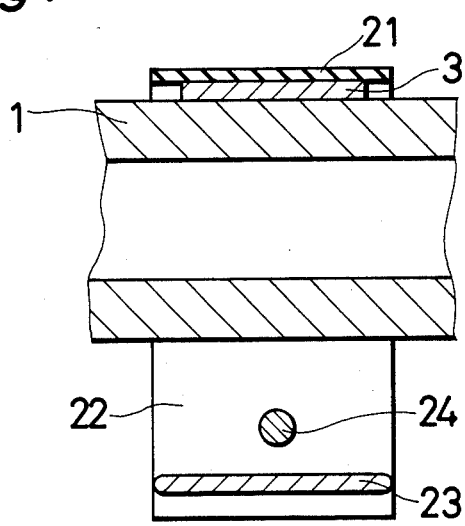
FIG. 12 is a sectional view along line V—V in FIG. 11.

FIG. 11 is a sectional view of still another embodiment of the transducer of this invention, and FIG. 12 is a sectional view thereof along line V—V. In FIG. 11, an expansive band 21 is a holder for forcing the bimorph 3 against the outer surface of pressure conduit 1. At both ends of the band 21 are fixed tightening pieces 22, 23 than can be used to tighten band 21 around the pressure conduit 1 by means of bolt 24 and nut 25. In this embodiment, since no case is needed, the structure may be extremely simplified. Again, the function of the bimorph 3 to detect pressure changes in the conduit 1 is the same as that of the transducer in FIG. 1.

In these drawings, the same reference numbers refer to identical parts, and duplicate explanations thereof are omitted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A transducer for detecting pressure changes in a pipe by detecting deformation of the pipe and for converting the pressure changes in the pipe into electric signals, said transducer comprising:
   a sensor element having a bimorph structure made of piezoelectric material, and
   a holder for forcing the sensor element against an outer surface of the pipe.

2. A transducer according to claim 1 wherein the sensor element is provided with an intermediate layer installed between piezoelectric pieces.

3. A transducer according to claim 1 wherein the holder is supported by a rigid case which is to surround the pipe.

4. A transducer according to claim 1 wherein the holder is an expansive band.

5. A transducer according to claim 4 wherein the ends of the expansive band are fixed to a case.

6. A transducer according to claim 6 wherein soft thin-wall parts are disposed between the pressure medium and the sensor element.

7. A transducer according to claim 6 wherein the soft thin-wall parts are rubber.

8. A transducer according to claim 1 wherein the holder is to surround the pipe.

9. A transducer according to claim 8 wherein opposite ends of the holder are fixed by tightening pieces.

10. A transducer for detecting pressure changes in a pipe by detecting deformation of the pipe and for converting the pressure changes in the pipe into electric signals, said transducer comprising:
    a sensor element having a bimorph structure made of piezoelectric material, and
    a pressure medium for forcing the sensor element against an outer surface of the pipe.

11. A transducer according to claim 10 wherein the pressure medium is gas or liquid.

* * * * *